(12) United States Patent
Pilloff

(10) Patent No.: US 8,650,193 B1
(45) Date of Patent: Feb. 11, 2014

(54) ROAD SPLITTING IN A MAP EDITOR

(75) Inventor: Mark D. Pilloff, San Jose, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 12/842,817

(22) Filed: Jul. 23, 2010

(51) Int. Cl.
*G06F 7/00* (2006.01)
*G06F 17/30* (2006.01)

(52) U.S. Cl.
USPC .................. 707/737; 701/409; 707/802

(58) Field of Classification Search
USPC ................................. 707/800–805, 737
See application file for complete search history.

(56) References Cited

U.S. PATENT DOCUMENTS

| | | | | |
|---|---|---|---|---|
| 2002/0027512 A1* | 3/2002 | Horita et al. | .................. | 340/988 |
| 2003/0055558 A1* | 3/2003 | Watanabe et al. | ............. | 701/208 |
| 2003/0059091 A1* | 3/2003 | Kambe et al. | ................. | 382/113 |
| 2003/0125871 A1* | 7/2003 | Cherveny et al. | ............ | 701/208 |
| 2004/0204829 A1* | 10/2004 | Endo et al. | .................... | 701/202 |
| 2005/0278386 A1* | 12/2005 | Kelly et al. | ................... | 707/200 |
| 2006/0082472 A1* | 4/2006 | Adachi et al. | ............ | 340/995.13 |
| 2008/0177469 A1* | 7/2008 | Geelen et al. | ................ | 701/209 |
| 2009/0006480 A1* | 1/2009 | Fuchs et al. | ................ | 707/104.1 |
| 2009/0015596 A1* | 1/2009 | Fuchs et al. | ................... | 345/619 |
| 2009/0070035 A1* | 3/2009 | Van Buer | ...................... | 701/210 |
| 2010/0011022 A1* | 1/2010 | Sugimoto et al. | .......... | 707/104.1 |
| 2010/0030459 A1* | 2/2010 | Geelen et al. | ................ | 701/200 |
| 2010/0168997 A1* | 7/2010 | Sakamoto | .................... | 701/200 |
| 2012/0016584 A1* | 1/2012 | Nakashima | ................... | 701/428 |
| 2012/0277993 A1* | 11/2012 | Mund | .......................... | 701/450 |

\* cited by examiner

*Primary Examiner* — Hosain Alam
*Assistant Examiner* — Navneet K Ahluwalia
(74) *Attorney, Agent, or Firm* — Fenwick & West LLP

(57) ABSTRACT

A method and system for editing map data by automatically splitting a road segment into a pair of road segments while maintaining the proper attributes and directionality for each road segment. A road segment that has two directions of travel is selected for splitting. A new road segment is instantiated to represent one of the directions of travel. A direction of travel is assigned to both of the road segments. Attributes that are common to both directions of travel are copied to the new road segment. Attributes that are only associated with the direction of travel of the new road segment are migrated to the new road segment.

22 Claims, 7 Drawing Sheets

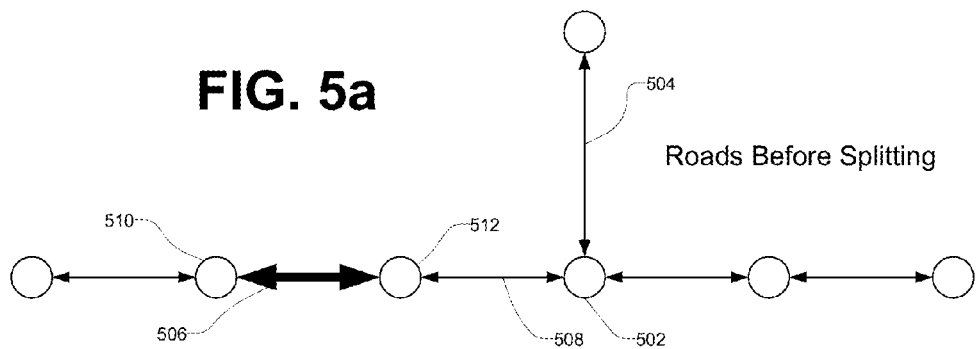
FIG. 5a Roads Before Splitting
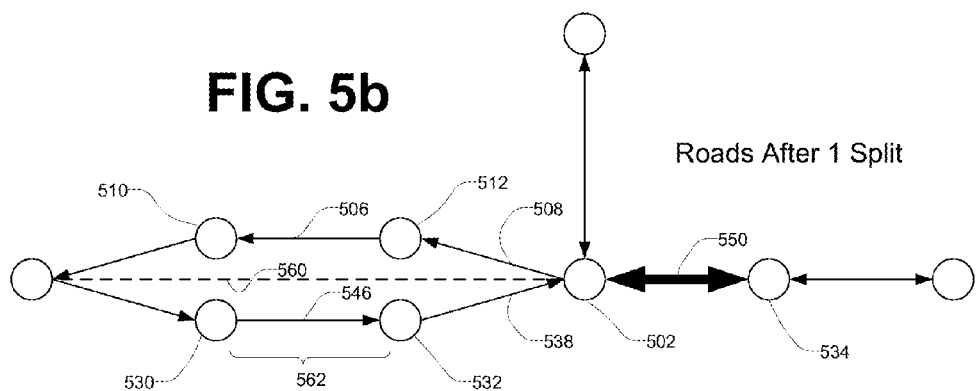
FIG. 5b Roads After 1 Split
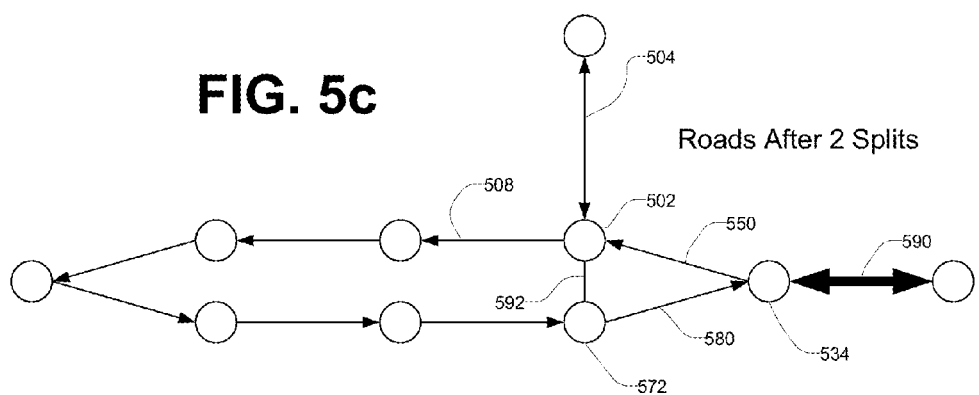
FIG. 5c Roads After 2 Splits

FIG. 7a

Attributes for User-Selected Segment

| Common attributes | Attributes for direction of travel towards node 510 | Attributes for direction of travel towards node 512 |
|---|---|---|
| Surface Type | P.O. Box | P.O. Box |
| Priority | Street Name | Street Name |
| Speed Limit | Street Number | Street Number |
| Usage | Turn Restrictions | Turn Restrictions |

| Common attributes | Attributes for direction of travel towards node 530 | Attributes for direction of travel towards node 532 |
|---|---|---|
| NULL | NULL | NULL |
| NULL | NULL | NULL |
| NULL | NULL | NULL |
| NULL | NULL | NULL |

Attributes for Newly Instantiated Segment

FIG. 7b

Attributes for User-Selected Segment

| Common attributes | Attributes for direction of travel towards node 510 | Attributes for direction of travel towards node 512 |
|---|---|---|
| Surface Type | P.O. Box | NULL |
| Priority | Street Name | NULL |
| Speed Limit | Street Number | NULL |
| Usage | Turn Restrictions | NULL |

| Common attributes | Attributes for direction of travel towards node 530 | Attributes for direction of travel towards node 532 |
|---|---|---|
| Surface Type | NULL | P.O. Box |
| Priority | NULL | Street Name |
| Speed Limit | NULL | Street Number |
| Usage | NULL | Turn Restrictions |

Attributes for Newly Instantiated Segment

US 8,650,193 B1

ROAD SPLITTING IN A MAP EDITOR

FIELD OF THE INVENTION

The present invention relates to map editing and more specifically to a map editor configured for automatically splitting a road segment into a pair of road segments while maintaining the proper attributes and directionality for each road segment.

BACKGROUND OF THE INVENTION

Digital maps are found in a wide variety of devices, including car navigation systems, hand-held GPS units, mobile phones, and also in many websites such as GOOGLE MAPS and MAPQUEST. Although digital maps are easy to use from an end-user's perspective, creating a digital map is a difficult and time-consuming process. Every digital map begins with a set of raw data representing millions of streets and intersections. The raw map data is derived from a variety of sources, each source providing different amounts and types information. In many cases, data from different sources is inaccurate and out of date. Oftentimes the data from the different sources is in a format which is not suitable for use in a real map. Integrating data from these heterogeneous sources so that it can be used and displayed properly is an enormous challenge.

In particular, many sources of map data use a very simple representation of two-way roads. These data sources treat a two-way road as a series of bi-directional road segments. However, in the real world, each two way street may have multiple lanes traveling in opposite directions that can at times be separated by hundreds of feet. In addition, each direction of travel may have its own road attributes, such as addresses, speed restrictions, and the like. Using a single road segment to represent two way roads in digital maps can thus lead to inaccurate maps. For example, if a single bi-directional road segment is overlaid onto a satellite image of a divided highway, the resulting map would be inaccurate because the road segment would be appear to sit on top of the median instead of on the highway itself.

SUMMARY OF THE INVENTION

A map editing system and method is configured to automatically split a road segment into a pair of road segments while maintaining the proper attributes and directionality for each road segment. A map editor displays road segments in a visual map to a user. The user selects a road segment that corresponds to a two-way road to be split using the map editor. The map editor instantiates a new road segment in the database, thus resulting in two road segments for the road. The map editor assigns the correct direction of travel to both of the road segments so that each road segment has a direction of travel that corresponds to a different direction of travel of the road. Attributes that are common to both directions of travel for the road are copied to the new road segment. Attributes that correspond to the direction of travel of the new road segment are copied to the new road segment and deleted from the original road segment. As a result, a single road segment can quickly be split into two separate road segments, increasing the accuracy of the map generated from the map data and reducing the time needed to process the raw map data.

The map editor can also be used to split one-way road segments. The user first selects a road segment that corresponds to lanes of a road that have one direction of travel. The map editor instantiates a new road segment in the database, thus resulting in two road segments for the road. The map editor assigns the correct direction of travel to the new road segment so that both road segments have the same direction of travel. The attributes of the original road segment are then copied to the new road segment.

In one embodiment, the road segments have nodes that define the endpoints of the road segments, and the nodes of the road segment are positioned so that it appears as if each road segment is being divided into two geometrically similar separate road segments. The map editor can receive a user input adjusting the distance between the road segments, which causes the map editor to update the placement of the road segments in the database. Additionally, the map editor configures the geometry of the new road segment so that it is based on the geometry of the original road segment. Furthermore, the map editor can receive a user input indicating that the split road segments intersect with another road. The map editor then instantiates a new road segment at the location of the intersection to connect the split road segments. Finally, after one segment is split, the map editor can automatically identify another segment of the same road to be split. These features help to facilitate fast processing of thousands of different road segments while maintaining the accuracy of the post-processed data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 5a-c illustrate a schematic view of the nodes and road segments as they are being split.

FIGS. 7a-7b illustrate the attributes associated with a pair of split road segments both before and after attributes are allocated between the two segments.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
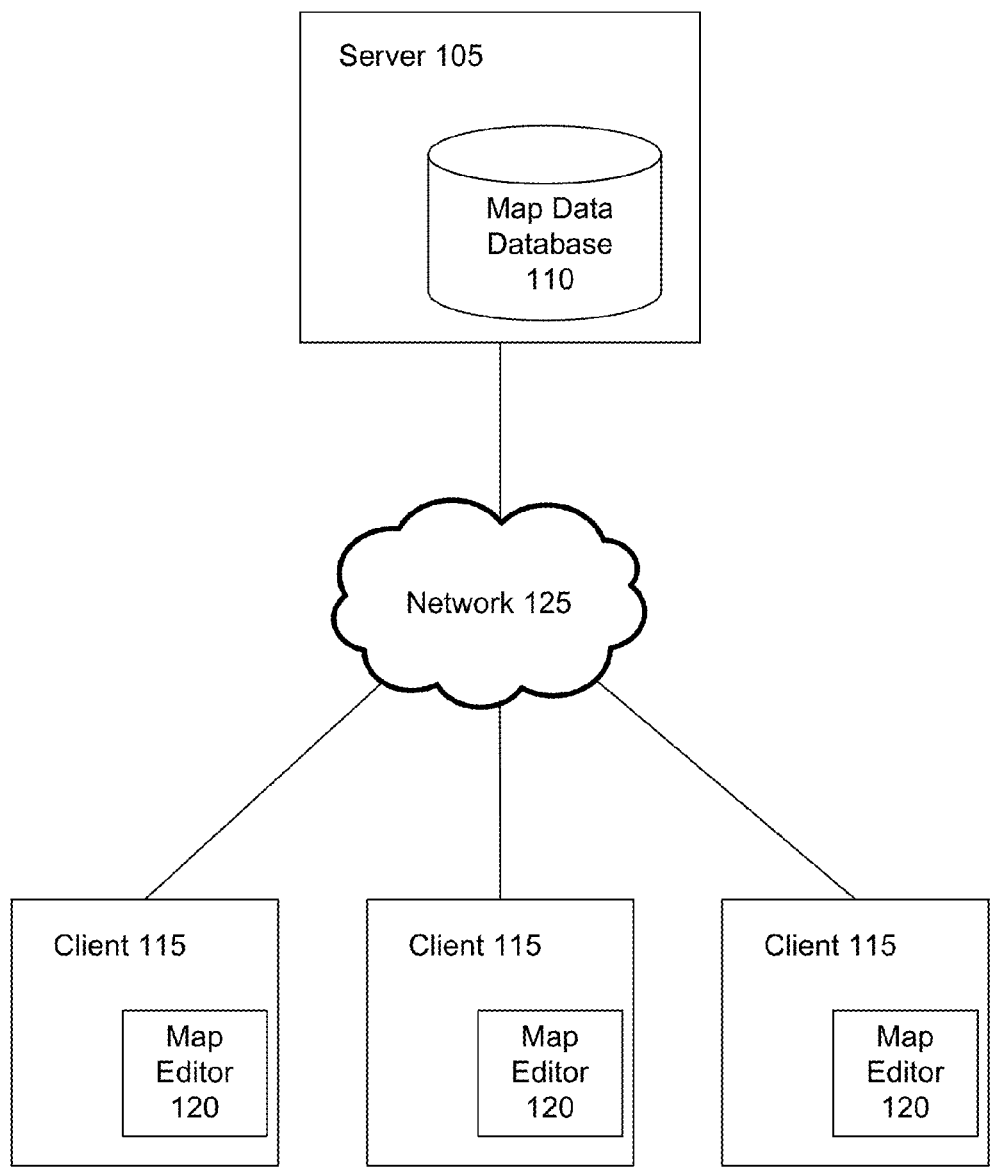
FIG. 1 is a high-level block diagram of a computing environment according to one embodiment.

FIG. 1 is a high-level block diagram that illustrates a computing environment for a map editor, according to one embodiment of the present disclosure. A shown in FIG. 1, the computing environment includes a server 105 connected to a number of client computers 115 through network 125. The network includes but is not limited to any combination of a LAN, MAN, WAN, mobile, wired or wireless network, a private network, or a virtual private network. While only three clients are shown to simplify and clarify the description, it is understood that very large numbers of client computers are supported and can be in communication with the server 105.

Both the server 105 and the clients 115 are computers that comprise a CPU, memory, network interface, peripheral interfaces, and other well known components. As is known to one skilled in the art, other types of computers can be used which have different architectures. The server 105 and the client 115 are also adapted to execute computer program modules for providing functionality described herein. As used herein, the term "module" refers to computer program logic used to provide the specified functionality. Thus, a module can be implemented in hardware, firmware, and/or software. In one embodiment, program modules are stored in on a storage device, loaded into memory, and executed by a processor or can be provided from computer program products that are stored in tangible computer-readable storage mediums (e.g. RAM, hard disk, or optical/magnetic media).

A map data database 110 is illustrated as being stored in server 105. Alternatively, many other configurations are possible. The database 110 does not need to be physically located within server 105. For example, the database can be placed within client 115, stored in external storage attached to server 105, or stored in network attached storage. Additionally, there may be multiple servers 105 that connect to a single database 110.

The database 110 contains map data that can be used to generate a digital road map. Physical roads are represented in the map data by a list of nodes and road segments which connect those nodes. Each node corresponds to a specific geographic location in the physical world. Each road segment corresponds to a section of a physical road that begins at one node and ends at a different node. The map data can be obtained from several different sources such as OASIS and TIGER. The map data can also be accessed by map editor 120, modified, and stored back into the database 110.

The client 115 executes map editor 120, which allows a user to modify the map data stored in map data database 110, for example in the process of creating a digital map. The map editor is configured to store map data to database 110. The data is visually displayed to a user as a set of nodes and road segments connecting those nodes. The user selects a segment of the road that represents a two-way road. The map editor then instantiates a new segment, assigns the appropriate directionality to the segments, and then allocates the appropriate attributes to each segment. Further, the map editor can determine if any other road segments intersect with the split segments. If so, an additional road segment can be instantiated at the location of the intersection to connect the split road segments. To facilitate fast processing of additional segments, the editor also automatically identifies another segment for splitting.

Road Splitting with the Map Editor

Figure 2:
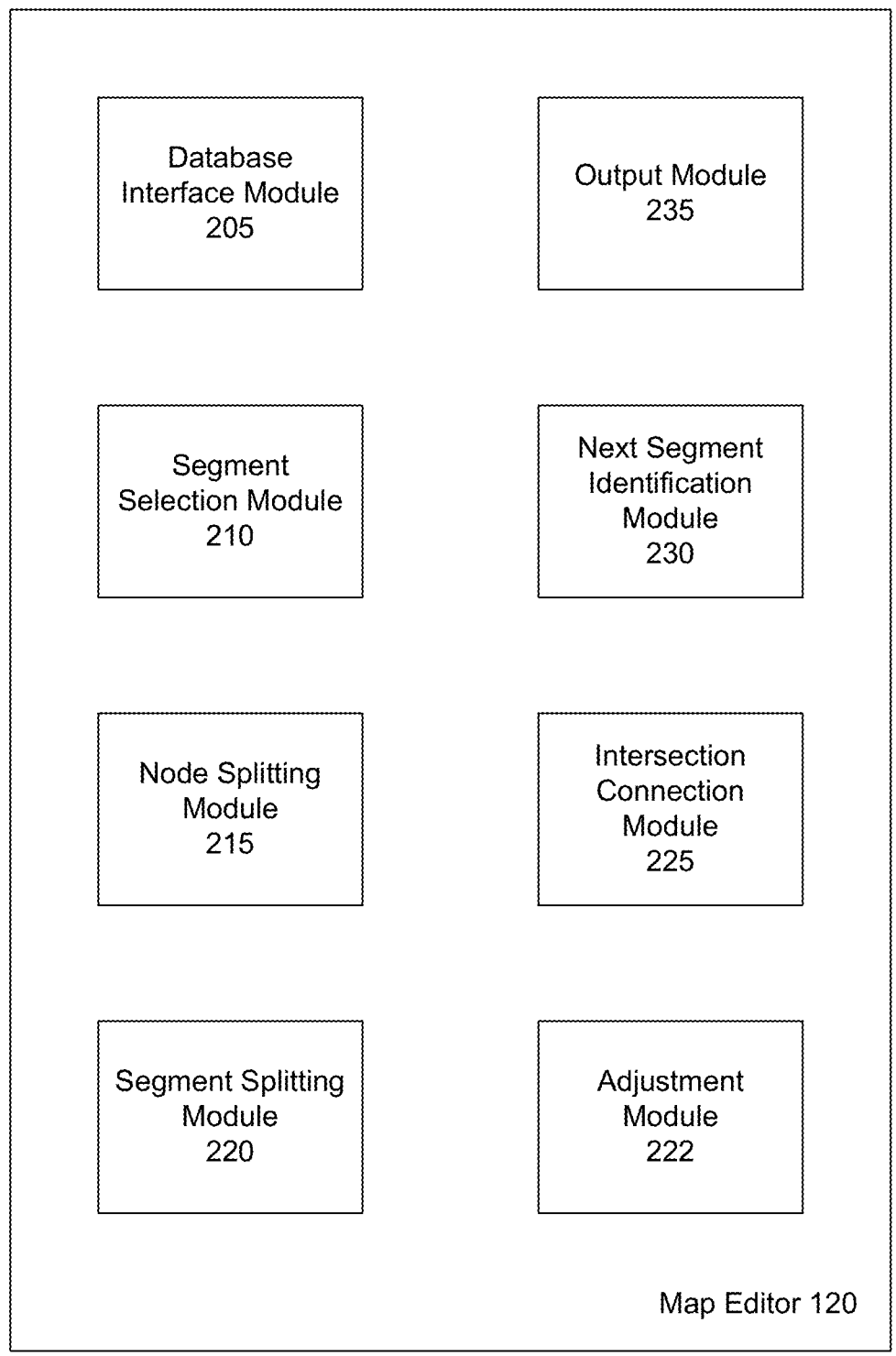
FIG. 2 is a high level block diagram illustrating modules within a map editor according to one embodiment.
Figure 3:
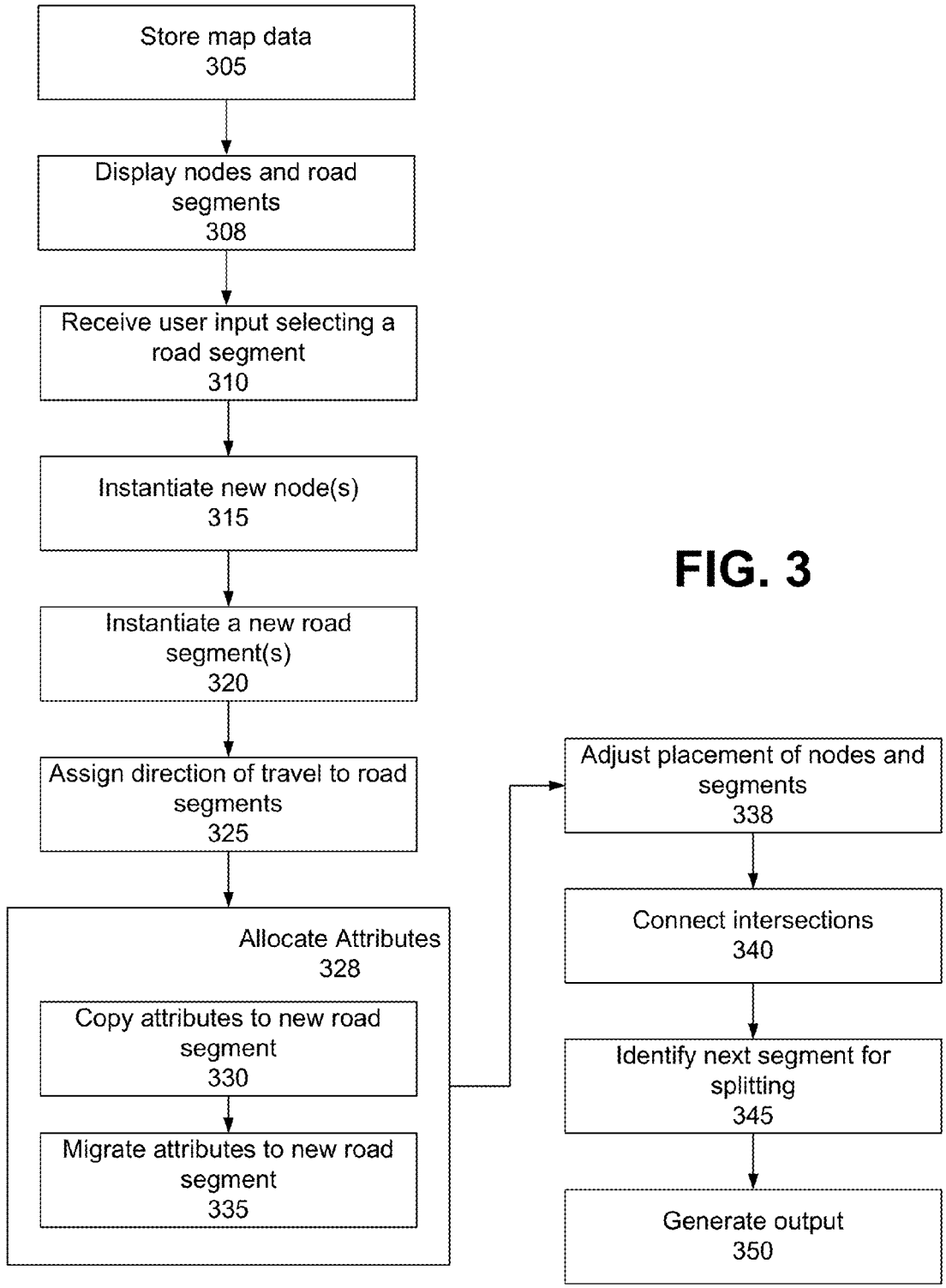
FIG. 3 is a process flow diagram for splitting road segments according to one embodiment.

Turning now to FIG. 2, illustrated is a high level block diagram illustrating modules within a map editor according to one embodiment. As illustrated, the map editor 120 includes a database interface module 205, a segment selection module 210, a node splitting module 215, a segment splitting module 220, an intersection connection module 225, a next segment identification module 230, and an output module 235. Some embodiments of the map editor 120 have different and/or other modules than the ones described herein. Similarly, the functions described herein can be distributed among the modules in accordance with other embodiments in a different manner than is described here. The detailed operation of these modules is next explained by reference to FIG. 3, which shows a flow diagram of a process for splitting road segments.

The database interface module 205 stores 305 and retrieves map data to and from the database 110. As discussed above, physical roads in the real world are represented in the map data as nodes and road segments that connect those nodes. Each node corresponds to a specific geographical location in the real world. The data representation for each node includes positional coordinates (e.g. latitude and longitude). The data representation for each node also includes a list of the road segments that are connected to the node.

Each of the road segments corresponds to a length of a road that has either one or two directions of travel. The data representation for each road segment includes an association with two nodes. The nodes mark the beginning and ending of each road segment. The data representation for each road segment also includes an ordered list of positional coordinates (e.g. latitude and longitude) that are used to re-create the geometry of the road segment, such as whether the road segment is straight or curved.

The data representation for each road segment further includes various sets of attributes that describe features of the road. One set of attributes ("non-directional" attributes) is common to both directions of travel of the road. A second set of attributes represents the features of one of the two directions of travel. A third set of attributes represents the features of the other direction of travel. The second and third sets of attributes are "directional" attributes because they represent features for only one direction of travel.

Attributes that are common to both directions of travel of a road include those attributes that describe the general characteristics of the road. Examples of common attributes are listed below:

Surface type (e.g. paved, gravel, dirt)

Priority (e.g. non-traffic, local road, minor arterial, major arterial, secondary, primary highway, limited access highway, controlled access highway)

Speed information (e.g. speed limit, recommended speed)

Usage (e.g. ramp, roundabout, trail)

Median width

Road width

Attributes that are associated only with a single direction of travel include the following attributes:

Street name

Street number or range of street numbers

P.O Box range

Political feature (e.g. county, state, province, civil division, locality, neighborhood)

Turn restrictions

Number of lanes

Thus, the data representation for each road segment includes three sets of attributes. One set of attributes corresponds to both directions of travel of the road ("non-directional" attributes). A second set of attributes corresponds to one direction of travel, and a third set of attributes corresponds to the other, opposing direction of travel ("directional attributes"). For ease of understanding, the following table illustrates three sets of attributes that are associated with a road segment:

| Non-Directional Attributes | Directional Attributes (first direction of travel) | Directional Attributes (second, opposing direction of travel) |
| --- | --- | --- |
| Surface type | PO Box | PO Box |
| Priority | Street name | Street name |
| Speed Information | Street number | Street number |
| Usage | Turn restrictions | Turn restrictions |

Each set of directional attributes is also associated with a target node. The target node is used to determine the precise direction of travel that a set of attributes corresponds to. For example, suppose that a road segment exists between two nodes, node A and node B. The first set of attributes is common to both directions of travel and does not have a target node. The second set of attributes can be associated with node A as the target node. These attributes correspond to lanes of a road carrying traffic from node B to node A. The third set of attributes can be associated with node B as the target node. These attributes correspond to lanes of a road carrying traffic from node A to node B.

To distinguish between one-way and two-way roads segments, each set of directional attributes is marked as corresponding to either an allowed or disallowed direction of travel. If only one of the two sets of directional attributes is marked as corresponding to an allowed direction of travel, then the road is a one-way road segment. If both sets of directional attributes are marked as corresponding to an allowed direction of travel, the road is a two-way road segment. For example, suppose again that a road segment exists between node A and node B. The set of attributes associated with target node B is marked as corresponding to a disallowed direction of travel. The set of attributes associated with target node A is marked as corresponding to an allowed direction of travel. This configuration results in a one-way road segment leading from Node B to Node A.

Figure 4A:
FIG. 4a-b illustrate a visual map of nodes and road segments generated by the map editor.

Next, the segment selection module 210 displays 308 the nodes and road segments in the form of a visual map to a user. The visual map can also include a satellite image of the area surrounding the displayed segments. For example, FIG. 4a illustrates a set of nodes and road segments as displayed in a visual map. There is one main road 405 made up of several nodes and segments that runs from the bottom left hand corner of the figure to the upper right hand corner of the figure. The road also intersects with other road segments 410 and 415. Although not shown in the figure, it is also possible to visually display the directionality of the road segments with graphical indicators such as arrows.

The segment selection module 210 receives 310 a user input selecting a road segment having two directions of travel for splitting, which is then highlighted in the display. For example, FIG. 5a illustrates a schematic view of a set of nodes and road segments that are displayed in a visual map. In this figure, two roads are shown intersecting at a T intersection 502. The first road is displayed vertically as a single road segment 504. The second road is displayed horizontally as a series of road segments, including segments 506 and 508. Road segment 506 is a two-way road segment that exists between node 510 and node 512. The user has selected a road segment 506 for splitting, which is here shown as a thicker line for ease of identification.

Next, the node splitting module 215 instantiates 315 two new nodes in the database. The node splitting module configures the coordinates of the newly instantiated nodes and the nodes of the originally selected road segment ("selected nodes") so that it appears as if each of the selected nodes is being divided into two separate nodes. One node appears to be pulled in a direction that is orthogonal to the originally selected segment. The other node appears to be pulled in the direct opposite direction. For example, referring to FIG. 5b, illustrated is a schematic representation of a road where the nodes and road segments have been split. The segment splitting module 215 instantiates two new nodes 530 and 532. The positional coordinates are also configured so that both new nodes 530, 532 are located to the South of the original position 560 of the selected road segment. The node splitting module also shifts the position of the selected nodes 510, 512 so that they are located to the North of the original position 560 of the selected road segment. As a result, it appears as if each of the selected nodes 510 and 512 is being divided into two separate nodes. It appears as if node 510 is being divided into nodes 510 and 530, and it appears as if node 512 is being divided into nodes 512 and 532. Additionally, the positional coordinates are configured so that the distance 562 between the new nodes 530 and 532 is equal to the distance between the selected nodes 510 and 512.

The positional coordinates of the newly instantiated nodes and the selected nodes can be set so that the distance between the new nodes 530, 532 and the selected nodes 510, 512 varies, depending on the system settings. The positional coordinates can be set so that the distance is equal to a pre-defined distance. For example, the node splitting module 215 may be configured so that the distance is always be equal to 10 meters. Alternatively, the distance may be calculated from the attributes of the selected road segment, such as priority and speed limit. For example, if a road segment is a highway with a 65 mph speed limit, the physical road corresponding to the road segment is probably relatively wide, so the nodes are placed 20 meters apart. However, if a road segment is a local road with a 15 mph speed limit, the physical road corresponding to the road segment is probably relatively narrow, so the nodes are placed only 8 meters apart.

Segment splitting module 220 splits the selected road segment into two separate road segments while maintaining the proper attributes, directionality, and geometry for each of the road segments. In one embodiment, the segment splitting module instantiates 320 one new road segment and modifies the attributes of the selected road segment. In another embodiment, the segment splitting module can instantiate two new segments and delete the originally selected road segment. In both embodiments, the end result is a pair of one-way road segments each having a direction of travel that is opposite to that of the other road segment. A detailed description of one embodiment of the segment splitting module 220 that instantiates a road segment while modifying the other road segment is explained in the following paragraphs.

First, the segment splitting module 220 instantiates 320 a new road segment in the database. When first instantiated, the instantiated segment can be represented as three sets of NULL attributes. The newly instantiated road segment is associated with the newly instantiated nodes so that the newly instantiated nodes define the endpoints of the newly instantiated road segment. For example, referring to FIG. 5b, the node splitting module 215 has previously instantiated new nodes 530 and 532. The segment splitting module 220 now instantiates a new road segment 546. New road segment 546 is associated with and connects nodes 530 and 532. Node 530 is assigned to be the target node of one set of NULL attributes. Node 530 is assigned to be the target node of another set of NULL attributes.

Figure 6:
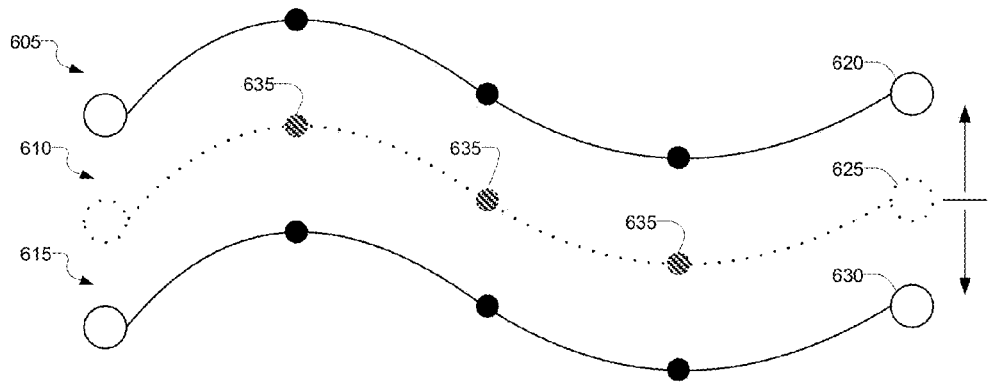
FIG. 6 illustrates a schematic view of the geometry of a pair of split road segments.

The system configures the geometry of the newly instantiated segment and the selected road segment (collectively, "the split road segments") so that it appears as if the selected road segment is being divided into two road segments, each having a geometry (e.g., shape) that is substantially similar to the original road segment. For example, referring to FIG. 6, illustrated is a schematic view of a road segment with a curved appearance after it is split into two road segments. Shown in the figure are a newly instantiated segment 605 with newly instantiated node 620, a selected segment 615 with a selected node 630, and the original position 610 of the selected segment with the original position of the selected node 625. The positions of the endpoints 620 and 630, or nodes, were set previously by the node splitting module 215. Each segment also has a geometry consisting of positional coordinates 635, as shown by the dark circles in the figure. In practice, the positional coordinates are simply used to re-create the shape of a road segment and are not actually displayed to the user. Due to the configuration of the geometry, the newly instantiated segment 605 has a curved appearance that is similar to the original shape 610 of the selected road segment. Similarly, the selected segment 615 has a curved appearance that is similar to the original shape 610 of the selected road segment. By contrast, if the geometry was not preserved, segments 605 and 615 would simply be straight lines along their entirety.

To preserve the geometry in the instantiated segment, the system copies the original geometry 635 of the selected segment into the instantiated segment. The coordinates of the geometry in the instantiated segment 605 are then adjusted to ensure that the shape of the instantiated segment 610 matches the original shape 610 of the selected segment. Similarly, the geometry of the selected segment 615 can be maintained by adjusting the coordinates of its geometry to match the original shape 610 of the selected segment.

Next, the segment splitting module 220 assigns 325 the proper direction of travel to the newly instantiated and selected road segments (the "split road segments"). Assuming the selected segment is a two-way road segment, the resulting split road segments will have opposite directions of travel. The directionality assigned to the split road segments depends on the driving rules of the country in which the roads are located. In countries where cars drive on the right hand side of the road, e.g. the United States, the segment splitting module 220 determines that traffic should travel in a counter-clockwise loop. In countries where cars drive on the left hand side of the road, e.g. the U.K., the segment splitting module 220 determines that traffic should travel in a clockwise loop.

For example, referring to FIG. 5b, illustrated is a set of split road segments after directionality is assigned. Assuming that the road segments represent roads in the United States, the segment splitting module determines that the flow of traffic on the split road segments should be in a counter-clockwise loop. Thus, it determines that the direction of travel on road segment 506 should be westbound from node 512 to node 510. This direction of travel is assigned to segment 506. Segment 506 is currently a segment with two directions of travel. It has one set of attributes associated with target node 512 and another set of attributes associated with target node 510. To assign the westbound direction of travel to segment 506, segment 506 is converted into a one-way road segment. Target node 512 and its associated attributes are marked as corresponding to a disallowed direction of travel. Target node 506 and its associated attributes are maintained as corresponding to an allowed direction of travel. The segment splitting module also determines that the direction of travel on road segment 546 should be in the opposite direction, eastbound, from node 530 to node 532. The east-bound direction of travel is assigned to segment 546 by marking target node 532 as corresponding to an allowed direction of travel. Target node 530 is marked as corresponding to a disallowed direction of travel.

After directions of travel are assigned, the segment splitting module 220 allocates 328 attributes between the split road segments so that each resulting road segment has the proper attributes that correspond to its assigned direction of travel. Attributes of the selected road segment that are common to both directions of travel are copied 330 to the newly instantiated road segment. Attributes that correspond only to the direction of travel of the newly instantiated road segment are migrated 335 to the new road segment. Migrating means that attributes are copied from the original road segment to the new road segment and deleted from the original road segment. These changes in the attributes are stored in the database.

For example, referring to FIG. 7a-b, illustrated are the attributes associated with the split road segments 506 and 546 of FIG. 5b. FIG. 7a illustrates the attributes associated with the split road segments after a new road segment 546 has been instantiated, but before it is associated with any attributes. The selected road segment 506 is still associated with three sets of attributes, and the newly instantiated road segment 546 is not yet associated with any attributes. FIG. 7b illustrates the attributes associated with the split road segments after the attributes are allocated. The segment splitting module copies 750 attributes that are associated with both directions of travel to the newly instantiated segment 546. Attributes associated only with the east-bound direction of travel towards node 512 are migrated 752 from the original segment to the newly instantiated segment. These changes are then stored to the database. The resulting tables of attributes represent two separate road segments, each of which corresponds to different lanes of a physical road having opposite directions of travel. Road segment 506 corresponds to lanes of a road having a west-bound direction of travel towards node 510. Road segment 546 corresponds to lanes of a road having an east-bound direction of travel towards node 532.

Up to this point, the operation of the segment splitting module 220 has been described with respect to splitting a two-way road segment. In one embodiment, the segment splitting module 220 can also be used to split a one-way road segment. Although the need to split road segments arises primarily with two-way road segments, it is sometimes necessary to split one-way road segments. For example, some highways have divided carpool lanes that run in the same direction as the highway but are separated from the highway by a barrier or road marking. To split a one-way segment, the steps of assigning 325 a direction of travel and allocating 328 attributes are slightly different than what has been described above. After instantiating a new segment, segment splitting module 220 assigns 325 the same direction of travel to both of the split road segments. The segment splitting module 220 then allocates 328 attributes by copying all of the attributes of the selected road segment to the instantiated road segment.

In another embodiment, segment splitting module 220 splits not only the selected road segment, but further splits road segments that share a common node with the selected road segment. For example, referring to FIG. 5a, the user has selected a segment 506 to be split. The selected segment 506 shares a common node 512 with another road segment 508. However, referring to FIG. 5b, splitting just segment 506 to create segment 540 would result in a gap in the road between nodes 532 and 502. Thus, the segment splitting module instantiates a new road segment 538 to fill this gap, assigns the proper directionality to segments 508 and 538, and copies and migrates attributes to the new segment 538 from segment 508. These changes are then stored to the database.

In another embodiment, after the user selects a segment to be split, node splitting module 215 instantiates 315 only one new node instead of two new nodes. The segment splitting module 220 then instantiates 320 a new road segment between the new node and one of the original nodes of the selected road segment, assigns 325 the proper directionality to the new road segment and the selected road segment, and copies 330 and migrates 335 attributes to the new segment. For example, referring to FIG. 5*b*, the user has selected a segment 550 for splitting. Segment 550 has a beginning node 502 and an ending node 534. Referring to FIG. 5*c*, illustrated are the road segments of FIG. 5*b* after segment 550 is split. The node splitting module instantiates a single node 572. Then, the segment splitting module instantiates a new road segment 580 to connect newly instantiated node 572 with node 534. The segment splitting module assigns the direction of travel towards node 534 to the new road segment 580 and assigns the direction of travel towards node 502 to the selected road segment 550. The segment splitting module also copies and migrates attributes to the new road segment 580 from the user selected segment 550.

In yet another embodiment, instead of selecting only one segment for splitting, the user selects multiple road segments for splitting. For example, referring to FIG. 5A, the user can select both segment 506 and 508 for splitting. The map editor then splits each of the selected nodes and road segments according to the process described above.

At this point in the process, a selected road segment has been split into two separate road segments, each having its own attributes, directionality, and geometry. Returning to FIG. 2, the adjustment module 222 now fine-tunes the split segments by adjusting 338 the placement of the split nodes and split road segments. The adjustment module 222 first overlays the split nodes and road segments onto a satellite image, which is displayed to a user. The user visually determines if the nodes and road segments are in their proper locations. If the placement of a node is not correct, the user moves the node to its correct location in the display. For example, the user can use a mouse to select the node and drag it to a different location, or use keyboard inputs to achieve the same result. If the geometry of a road segment is not correct, the user alters the shape of the segment in the display. For example, the user can use a mouse to select a portion of a road segment and move it to a different location, thereby changing the shape of the segment. Additionally, the user can adjust the distance between the split nodes and split road segments. For example, the user may press the up arrow to increase the split distance or down arrow to decrease the split distance. As the nodes and road segments are adjusted, the adjustment module 222 updates the positional coordinates of the nodes and the geometry data of the road segments to match their new placement in the display. The updated map data is stored in the database.

The intersection connection module 225 connects 340 the split road segments in order to account for any intersections with the split road segments. In one embodiment, a map of the split nodes and road segments is displayed to the user. The user then visually determines whether another road intersects with the portion of the road that was just split. If so, the user enters a command to connect the split road segments. In response, the intersection connection module 225 instantiates a new segment to connect the nodes that were just split by the node splitting module 215. For example, referring to FIG. 5*c*, the vertically oriented road segment 504 intersects with the split road segment 550 at node 502. Without a connecting road segment 592, the map is not completely accurate because there is a gap between node 502 and 572. As a result, it appears as if a car traveling south on road segment 504 cannot turn left onto road segment 580. To remedy this problem, a user enters a command to connect the road segments.

The intersection connection 225 module then instantiates a new road segment 592 to connect nodes 502 and 572.

In another embodiment, the intersection connection module 225 automatically connects the nodes of a split road segment after each split without any user input. Automatically connecting intersections can be enabled or disabled by a configuration setting in the map editor.

In a further embodiment, the intersection connection module automatically identifies intersections with the split road segments and connects 340 the split road segments only if an intersection exists. To identify an intersection, the intersection module evaluates each node of the selected road segment to determine whether the node is connected to more than two road segments. If so, each road segment is evaluated to determine if they have different street names. If so, an intersection exists at that node. Once an intersection is identified, the intersection connection module instantiates a new road segment to connect the node with one of the newly instantiated nodes.

The next segment identification module 230 facilitates faster operation of the road splitting process by identifying 345 another road segment to be split. Identifying the next road segment is an optional step that is activated by a user command or setting in a configuration file. The next segment identification module 230 identifies a next segment by finding a segment that shares a common node with the selected road segment. If more than one segment shares a common node with the selected segment, the system also compares the attributes of the selected segment and each of the potential candidates in order to identify the segment with the fewest changes in attributes. The system can also consider the change in angular direction between the current segment and the next segment to identify the segment with the smallest change in angular direction. For example, in FIG. 5*b*, the user selects a road segment 550 and splits it, resulting in the map as shown in FIG. 5*c*. The next segment identification module 230 determines that road segment 590 shares a common node 534 with road segment 550. It also determines that road segment 504 shares a common node 502 with segment 550. However, segment 590 has same name as road segment 550, whereas segment 504 has a different name. Thus, road segment 590 is identified as the next segment to be split.

Once the next segment is identified, the segment can be presented to a user, who determines whether to split the next segment. Alternatively, the identified segment can automatically be split without any user input by the node splitting module 215 and segment splitting module 220 according to the above-described process.

Figure 4B:

The output module 235 generates 350 an output of the nodes and road segments. The output can be in the form of a visual road map that is displayed 3 on a screen. For example, FIG. 4*b* illustrates a visual road map generated by the output module 235. The figure shows a road 405 with several road segments that have been split by the map editor. The nodes and segments are displayed along with a satellite image of the surrounding area. The split road segments also intersect with another road 415. Alternatively, the output module can store the newly instantiated and modified map data in the map data database 110.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for splitting road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for editing map data, comprising:
    storing in a database a plurality of road segments, each road segment associated with a plurality of attributes describing features of the road segment;
    receiving a user input selecting a first road segment for splitting from the plurality of road segments, the first road segment corresponding to a road having two directions of travel; and
    automatically splitting the first road segment responsive to the user input selecting the first road segment for splitting by:
        instantiating a second road segment;
        assigning a first direction of travel from the two directions of travel to the first road segment;
        assigning a second direction of travel from the two directions of travel to the second road segment, the second direction of travel being different than the first direction of travel;
        copying a first set of the attributes of the first road segment to the second road segment, where the first set of the attributes are those common to both the first and second directions of travel;
        migrating a second set of the attributes of the first road segment to the second road segment, where the second set of the attributes correspond to the second direction of travel; and
        storing the second road segment, the first set of the attributes copied to the second road segment, and the second set of the attributes migrated to the second road segment, to the database.

2. The method of claim 1, wherein the first road segment is associated with a first node and a second node.

3. The method of claim 2, further comprising;
    instantiating a third and fourth nodes, wherein the second road segment is instantiated between the third and fourth nodes.

4. The method of claim 2, further comprising;
    instantiating a third node, wherein the second road segment is instantiated between the first and third nodes.

5. The method of claim 3, wherein the nodes are positioned so that a distance between the first and second nodes is equal to a distance between the third and fourth nodes.

6. The method of claim 3, wherein the nodes are positioned so that a distance between the first and third nodes is equal a distance between the second and fourth nodes.

7. The method of claim 3, wherein the nodes are positioned so that a distance between the first and third nodes is equal to a pre-defined distance.

8. The method of claim 3, wherein the nodes are positioned so that a distance between the first and third nodes is based on at least one of the following attributes: width of a median between the first and second road segments, road width of the first and second road segments, number of lanes in the first and second road segments, priority of the first and second road segments, and speed information for the first and second road segments.

9. The method of claim 1, wherein migrating the second set of attributes comprises copying the second set of attributes from the first road segment to the second road segment and deleting the second set of attributes from the first road segment.

10. The method of claim 1, wherein the second set of attributes migrated to the second road segment include at least one of turn restrictions, street name, or a range of street numbers.

11. The method of claim 1, wherein the first set of attributes copied to the second road segment include at least one of priority, surface type, usage, or speed information.

12. The method of claim 1, wherein the second road segment has a geometry that is based on a geometry of the first road segment.

13. The method of claim 1, further comprising:
    receiving a user input adjusting a distance between the first and second segments;

updating, in the database, a position of the first and second segments based on the user input.

14. The method of claim 1, further comprising:
receiving a user input to connect intersections;
responsive to receiving the user input to connect intersections, instantiating a third road segment connecting the first segment with the second segment, the third road segment corresponding to an intersection; and
storing the third road segment to the database.

15. The method of claim 1, further comprising:
identifying a third road segment, the third road segment sharing a common node with the first road segment; and
displaying the third road segment in highlighted form.

16. The method of claim 15, wherein identifying a third road segment comprises identifying the third road segment based on differences in attributes between the first and third road segments.

17. The method of claim 1, wherein assigning the first direction of travel to the first road segment comprises converting the first road segment from a road segment with two directions of travel to a road segment with one direction of travel.

18. A computer implemented method for editing map data, comprising:
storing in a database a plurality of road segments, each road segment associated with a plurality of attributes describing features of the road segment;
receiving a user input selecting a first road segment for splitting from the plurality of the road segments, the first road segment corresponding to lanes of a road having one direction of travel; and
automatically splitting the first road segment responsive to the user input selecting the first road segment for splitting by:
instantiating a second road segment;
assigning a direction of travel to the second road segment, such that second road segment has a direction of travel that corresponds to the one direction of travel of the lanes of the road;
copying attributes of the first road segment to the second road segment; and
storing the second road segment and the attributes copied to the second road segment, to the database.

19. A system for editing map data, comprising:
a non-transitory computer-readable medium storing modules that include:
a database interface module configured to store in a database a plurality of road segments, each road segment associated with a plurality of attributes describing features of the road segment;
a segment selection module configured to receive a user input selecting a first road segment for splitting from the plurality of road segments, the first road segment corresponding to a road having two directions of travel; and
a segment splitting module configured to automatically split the first road segment responsive to the user input selecting the first road segment for splitting by:
instantiating a second road segment;
assigning a first direction of travel from the two directions of travel to the first road segment;
assigning a second direction of travel from the two directions of travel to the second road segment, the second direction of travel being different than the first direction of travel;
copying a first set of the attributes of the first road segment to the second road segment, where the first set of the attributes are those common to both the first and second directions of travel;
migrating a second set of the attributes of the first road segment to the second road segment, where the second set of the attributes correspond to the second direction of travel; and
storing the second road segment, the first set of the attributes copied to the second road segment, and the second set of the attributes migrated to the second road segment, to the database; and
a processor to execute the modules.

20. A system for editing map data, comprising:
a non-transitory computer-readable medium storing modules that include:
a database interface module configured to store in a database a plurality of road segments, each road segment associated with a plurality of attributes describing features of the road segment;
a segment selection module configured to receive a user input selecting a first road segment for splitting from the plurality of the road segments, the first road segment corresponding to lanes of a road having one direction of travel; and
a segment splitting module configured to automatically split the first road segment responsive to the user input selecting the first road segment for splitting by:
instantiating a second road segment;
assigning a direction of travel to the second road segment, such that the second road segment has a direction of travel that corresponds to the one direction of travel of the lanes of the road;
copying attributes of the first road segment to the second road segment; and
storing the second road segment, and the attributes copied and migrated to the second road segment, to the database; and
a processor to execute the modules.

21. A non-transitory computer-readable medium storing instructions, the instructions when executed by a processor cause the processor to:
store in a database a plurality of road segments, each road segment associated with a plurality of attributes describing features of the road segment;
receive a user input selecting a first road segment for splitting from the plurality of road segments, the first road segment corresponding to a road having two directions of travel; and
automatically split the first road segment responsive to the user input selecting the first road segment for splitting by:
instantiating a second road segment;
assigning a first direction of travel from the two directions of travel to the first road segment;
assigning a second direction of travel from the two directions of travel to the second road segment, the second direction of travel being different than the first direction of travel;
copying a first set of the attributes of the first road segment to the second road segment, where the first set of the attributes are those common to both the first and second directions of travel;
migrating a second set of the attributes of the first road segment to the second road segment, where the second set of the attributes correspond to the second direction of travel; and
storing the second road segment, the first set of the attributes copied to the second road segment, and the second set of the attributes migrated to the second road segment, to the database.

22. A non-transitory computer-readable medium storing instructions, the instructions when executed by a processor cause the processor to:

store in a database a plurality of road segments, each road segment associated with a plurality of attributes describing features of the road segment;

receive a user input selecting a first road segment for splitting from the plurality of the road segments, the first road segment corresponding to lanes of a road having one direction of travel; and automatically split the first road segment responsive to the user input selecting the first road segment for splitting by:

instantiating a second road segment;

assigning a direction of travel to the second road segment, such that second road segment has a direction of travel that corresponds to the one direction of travel of the lanes of the road;

copying attributes of the first road segment to the second road segment; and storing the second road segment and the attributes copied to the second road segment, to the database.

* * * * *